(12) United States Patent
Cheng

(10) Patent No.: US 8,977,450 B2
(45) Date of Patent: Mar. 10, 2015

(54) AUTOMATIC GEAR-SHIFTING BICYCLE WITH OPTIMAL SHIFT TIMING

(75) Inventor: Chi-Chang Cheng, New Taipei (TW)

(73) Assignee: J.D. Components Co., Ltd., Chang Hua Hsien (TW)

( * ) Notice: Subject to any disclaimer, the term of this patent is extended or adjusted under 35 U.S.C. 154(b) by 257 days.

(21) Appl. No.: 13/541,234

(22) Filed: Jul. 3, 2012

(65) Prior Publication Data
US 2013/0054102 A1 Feb. 28, 2013

(30) Foreign Application Priority Data
Aug. 24, 2011 (TW) .............................. 100130309 A

(51) Int. Cl.
*B62M 9/123* (2010.01)
*B62M 25/08* (2006.01)

(52) U.S. Cl.
CPC ............... *B62M 25/08* (2013.01); *B62M 9/123* (2013.01)
USPC .................................. 701/55; 701/56; 474/70

(58) Field of Classification Search
None
See application file for complete search history.

(56) References Cited

U.S. PATENT DOCUMENTS

| | | | | |
|---|---|---|---|---|
| 4,608,878 A | * | 9/1986 | Shimano | 74/594.2 |
| 5,254,044 A | * | 10/1993 | Anderson | 474/70 |
| 6,595,072 B2 | | 7/2003 | Liao | |
| 6,857,975 B2 | * | 2/2005 | Kitamura | 474/70 |
| 2007/0155553 A1 | * | 7/2007 | Campagnolo et al. | 474/106 |
| 2008/0036451 A1 | * | 2/2008 | Klode | 324/207.2 |

FOREIGN PATENT DOCUMENTS

| | | |
|---|---|---|
| CN | 2507776 Y | 8/2002 |
| CN | 101412427 A | 4/2009 |
| DE | 102004022789 A1 | 12/2005 |
| WO | WO-2004016496 A1 | 2/2004 |
| WO | WO-2009036623 A1 | 3/2009 |

* cited by examiner

*Primary Examiner* — John R Olszewski
*Assistant Examiner* — Gerrad A Foster
(74) *Attorney, Agent, or Firm* — Muncy, Geissler, Olds & Lowe, P.C.

(57) ABSTRACT

An automatic gear-shifting bicycle includes: a bicycle body provided with two cranks, two pedals and a derailleur, a power supply module, a microcomputer, a gear shifting control driver, and a pedal position sensor module installed in the bicycle body corresponding to the cranks and electrically coupled to the microcomputer for enabling the microcomputer to determine the angular position and forward/backward pedaling of the cranks. The microcomputer calculates the optimal shift timing subject to the time point the crank to be moved over the pedaling dead point in the next time, the pedaling speed to be below a predetermined speed value or the cranks are been pedaling backwardly.

19 Claims, 12 Drawing Sheets

AUTOMATIC GEAR-SHIFTING BICYCLE WITH OPTIMAL SHIFT TIMING

BACKGROUND OF THE INVENTION

1. Field of the Invention

The present invention relates to automatic gear-shifting bicycles and more particularly, to an automatic gear-shifting bicycle with optimal shift timing.

2. Description of the Related Art

In regular automatic gear-shifting bicycles, the shift timing is normally determined subject to the speed of the bicycle and the speed of the pedal. At the present time, no any shift timing determination technology is based on pedaling foot angle. If a rider of an automatic gear-shifting bicycle shifts the gears when pedaling the pedals heavily, shifting of the gear ratio of the derailleur will be unstable, affecting bicycle riding comfort. Therefore, when shifting the gears while pedaling the pedals lightly, the derailleur will be operated smoothly, enhancing bicycle riding comfort.

However, shifting the gears of an automatic gear-shifting bicycle must be performed during forward pedaling, and therefore, determining shift timing subject to the rider's pedaling status must consider the pedaling direction, i.e., pedaling direction must be simultaneously taken into account.

WO 2009036623 discloses a power control device for electric bike, which uses a Hall sensor for sensing, determining whether or not the electric bike is moving forward. In the specification, FIG. 2 and FIG. 3 respectively illustrate the waveforms sensed by the Hall sensor during forward rotation and backward rotation.

CN 101412427 discloses a backward pedaling detection circuit for an e-bike motor driver, comprises a charging/discharging circuit for charging and discharging the external capacitor to meet the threshold voltage required by the hysteresis comparator, based on the input from the Hall sensor, avoiding false triggering of motor. This invention also discloses a Hall sensor to detect forward/backward rotation.

SUMMARY OF THE INVENTION

The present invention has been accomplished under the circumstances in view. It is the main object of the present invention to provide an automatic gear-shifting bicycle with optimal shift timing, which can determine the optimal shift timing, and control the derailleur to shift the gears at this optimal time point.

To achieve this and other objects of the present invention, an automatic gear-shifting bicycle with optimal shift timing comprises: a bicycle body comprising a bottom bracket bearing axle, two cranks respectively coupled to the bottom bracket bearing axle, a pedal supported on each crank, and a derailleur; a power supply module installed in the bicycle body; a microcomputer electrically coupled to the power supply module; a gear shifting control driver electrically coupled to the microcomputer, and controllable by the microcomputer to drive the derailleur to change gears; and a pedal position sensor module installed in the bicycle body corresponding to at least one crank and electrically coupled to the microcomputer for enabling the microcomputer to determine the angular position of at least one crank and the pedaling direction of at least one crank to be forward pedaling or backward pedaling. When a person riding the automatic gear-shifting bicycle is pedaling the pedals, the microcomputer determines the optimal shift timing subject to one of the conditions: (1) sensing the angular position of at least one crank at a predetermined location during forward pedaling and the related time point, and enabling the microcomputer to calculate, subject to the sensed angular position and time point, the time point in which at least one crank will pass the pedaling dead point in the next time, and using the calculated time point as the optimal shift timing; or (2) sensing the time point each time at least one crank reaches the pedaling dead point during forward pedaling, and using the sensed time point as the optimal shift timing; or (3) sensing the pedaling speed of at least one crank during forward pedaling, and determining the time point in which the pedaling speed is below a predetermined speed value to be the optimal shift timing and ignoring the time point of the pedaling dead point; or (4) sensing a backward pedaling of at least one crank, and judging the time point to be the optimal shift timing when a backward pedaling of at least one crank is sensed.

Other advantages and features of the present invention will be fully understood by reference to the following specification in conjunction with the accompanying drawings, in which like reference signs denote like components of structure.

DETAILED DESCRIPTION OF THE INVENTION

Figure 1:
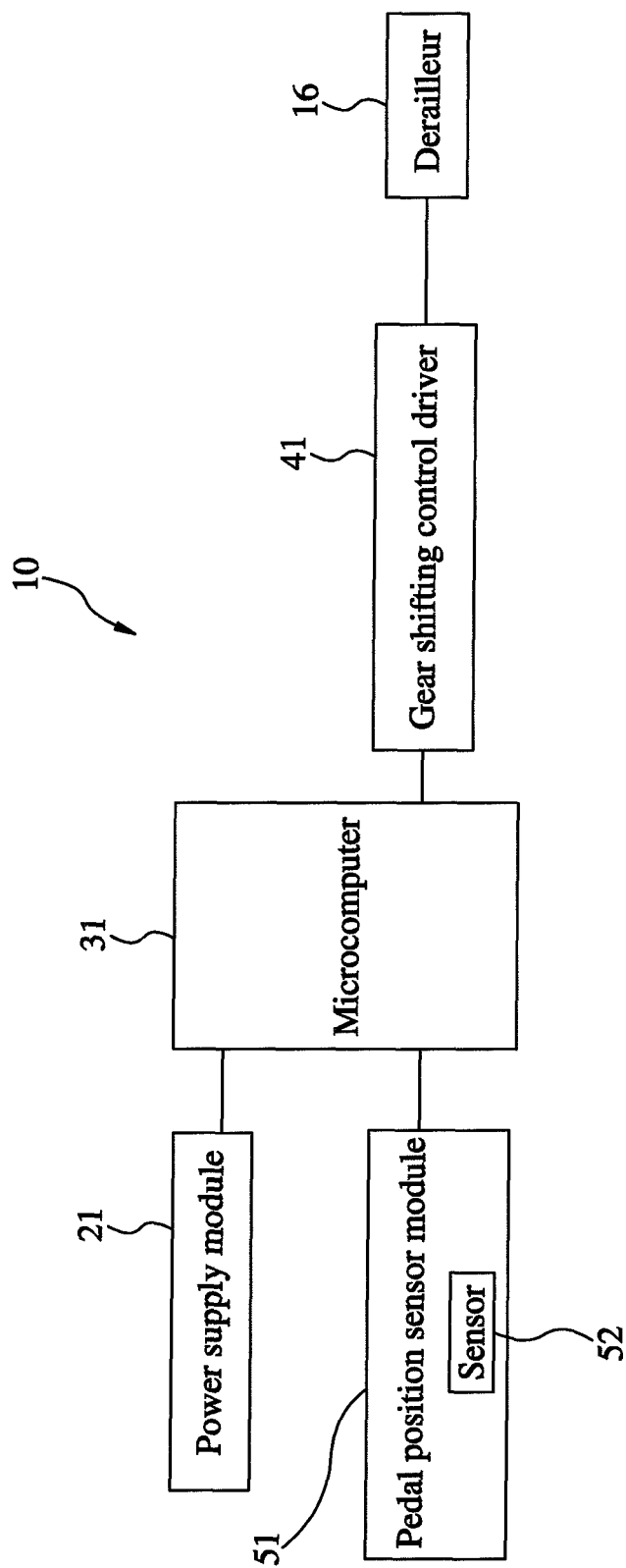
FIG. 1 is a system block diagram of an automatic gear-shifting bicycle with optimal shift timing in accordance with a first embodiment of the present invention (bicycle body excluded).
Figure 2:
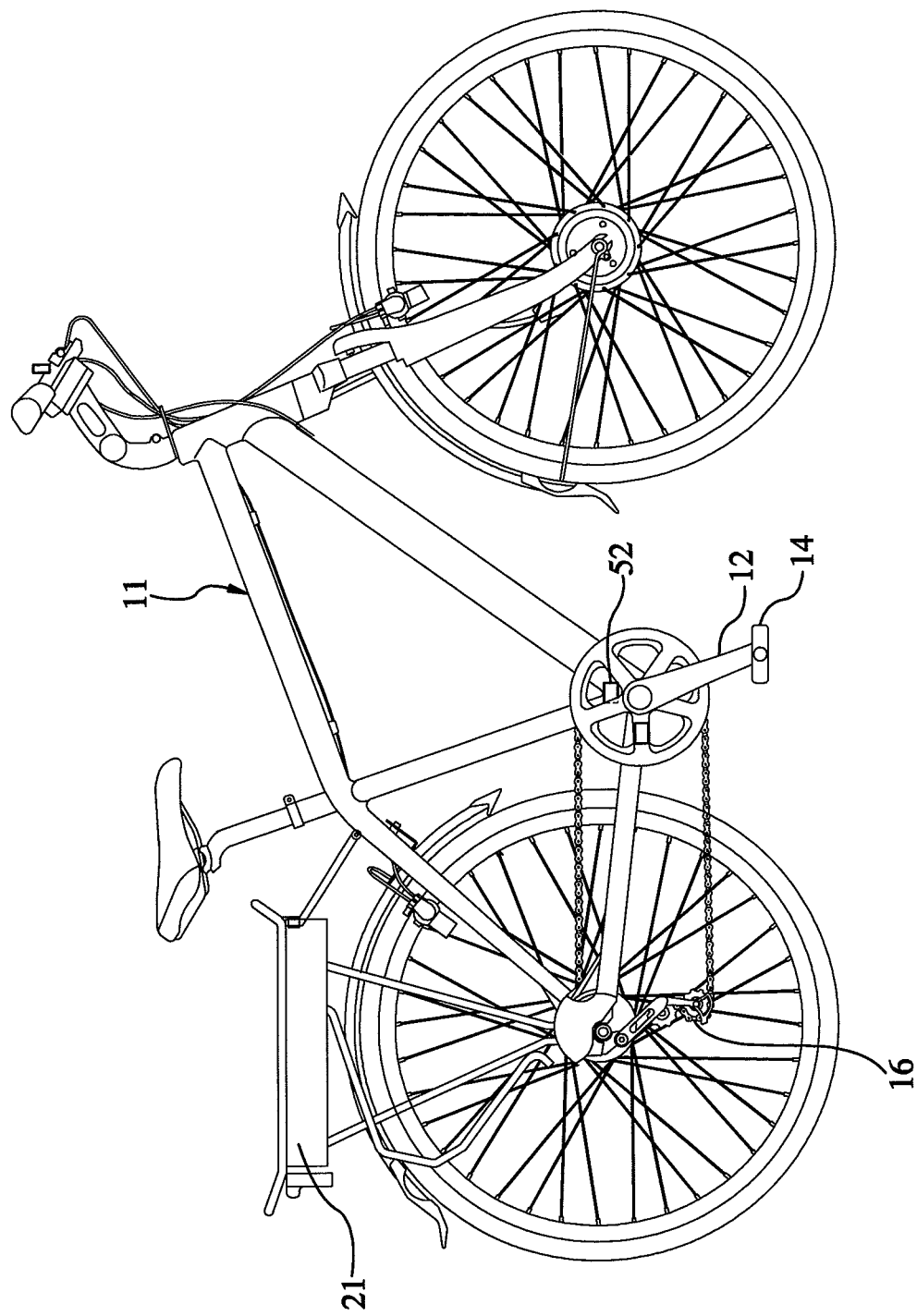
FIG. 2 is a side view of the automatic gear-shifting bicycle with optimal shift timing in accordance with the first embodiment of the present invention.
Figure 3:
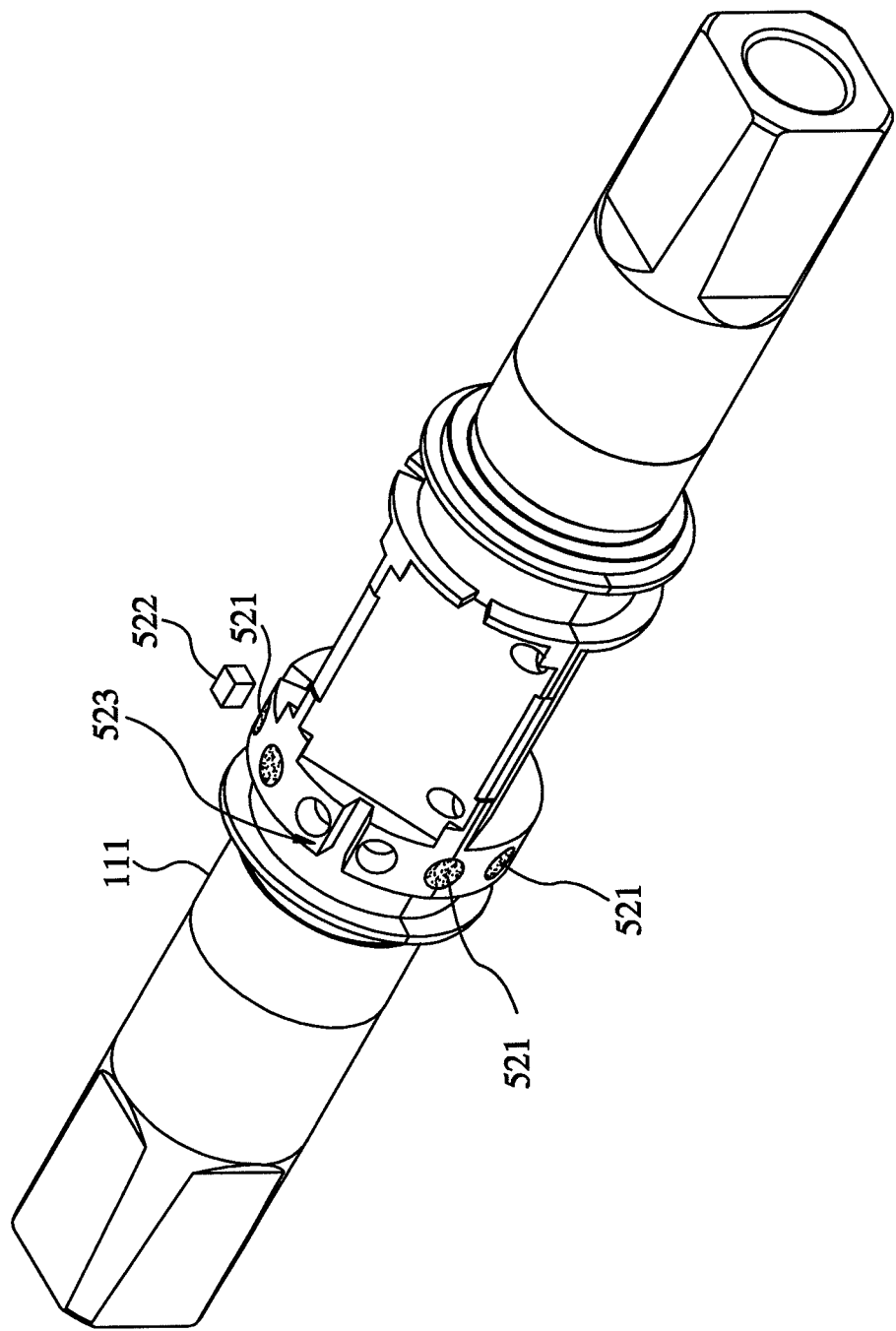
FIG. 3 is a schematic elevational view of a part of the first embodiment of the present invention, illustrating the structure of the pedal position sensor module.

Referring to FIGS. 1-3, an automatic gear-shifting bicycle with optimal shift timing 10 in accordance with a first embodiment of the present invention is shown. The automatic gear-shifting bicycle with optimal shift timing 10 comprises a bicycle body 11, a power supply module 21, a microcomputer 31, a gear shifting control driver 41, and a pedal position sensor module 51.

The bicycle body 11 comprises a bottom bracket bearing axle 111, two cranks 12 respectively coupled to the bottom bracket bearing axle 111, a pedal 14 supported on each crank 12, and a derailleur 16.

The power supply module 21 is installed in the bicycle body 11. According to this embodiment, the power supply module 21 is a battery pack.

The microcomputer 31 is electrically coupled to the power supply module 21.

The gear shifting control driver 41 is electrically coupled to the microcomputer 31, and controlled by the microcomputer 31 to drive the derailleur 16 to change gears.

The pedal position sensor module 51 is installed in the bicycle body 11 corresponding to one crank 12, and electrically coupled to the microcomputer 31. Subject to the sensing operation of the pedal position sensor module 51, the microcomputer 31 knows the angular position of the respective crank 12 and the pedaling direction to be forward pedaling or backward pedaling. In this first embodiment, the pedal position sensor module 51 comprises a sensor 52 corresponding to pedaling dead point of the respective crank 12. This sensor 52 is a bottom bracket sensor. Subject to the signal sensed by the sensor 52, forward pedaling or backward pedaling of the crank 12 is determined. According to this first embodiment, the sensor 52 comprises a plurality of magnets 521 arranged around the bottom bracket bearing axle 111, and a Hall component 522 mounted in the bottom bracket (not shown) of the bicycle body 11. These magnets 521 are equally spaced, exhibiting a C-shaped arrangement around the bottom bracket bearing axle 111, leaving a vacancy 523 corresponding to at least one magnet. In this first embodiment, the vacancy 523 faces toward the crank body of the respective crank 12.

When the rider is pedaling the pedals 14, the microcomputer 31 determines the optimal shift timing subject to one of the conditions: (1) sensing the angular position of at least one crank at a predetermined location during forward pedaling and the related time point, and enabling the microcomputer to calculate, subject to the sensed angular position and time point, the time point in which at least one crank will pass the pedaling dead point in the next time, and using the calculated time point as the optimal shift timing; or (2) sensing the time point each time at least one crank reaches the pedaling dead point during forward pedaling, and using the sensed time point as the optimal shift timing; or (3) sensing the pedaling speed of at least one crank during forward pedaling, and determining the time point in which the pedaling speed is below a predetermined speed value to be the optimal shift timing and ignoring the time point of the pedaling dead point; or (4) sensing a backward pedaling of at least one crank, and judging the time point to be the optimal shift timing when a backward pedaling of at least one crank is sensed.

In the aforesaid condition (1), calculation is made based on the angular position of the crank 12 and the corresponding time point to estimate the pedaling speed during forward pedaling, and then the microcomputer 31 calculates the time point in which at least one crank will pass the pedaling dead point in the next time.

Figure 4:
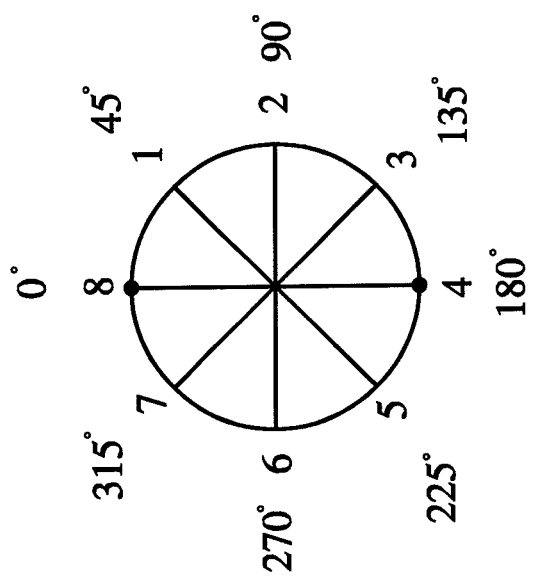
FIG. 4 is a schematic drawing of the first embodiment of the sent invention, illustrating the angular positions of eight points to be passed over by the cranks in one revolution cycle.

Referring to FIG. 4 and FIG. 2 again, every time one crank 12 passes through the angular position of Point 1 (45° angle) or Point 5 (225° angle), the related time point is used for estimating the time point in which the crank 12 will passes through Point 4 (180° angle) or Point 8 (0° angle) in the next time, thereby estimating the time point each time the crank 12 passes through the pedaling dead point during forward pedaling. This estimated time point is taken as the optimal shift timing. In the example shown in FIG. 4, Point 1 or Point 5 is the predetermined location where the angular position of the crank 12 is to be sensed, and Point 4 or Point 8 is the angular position of pedaling dead point.

The aforesaid pedaling dead point is the angular position of the crank 12 with least pedal torque, i.e., of 0° angle position and 180° angle position for the horizontal plane.

In the aforesaid condition (3), the predetermined speed value is the difference between the virtual pedaling speed of bicycle speed and gear ratio and an added value, wherein the added value is at least 10 revolutions per minute.

Figure 5:
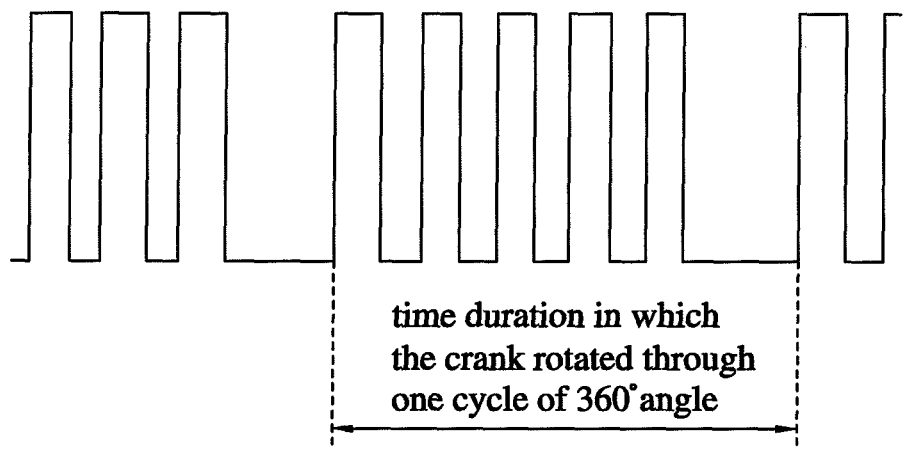
FIG. 5 is a sensor waveform diagram obtained according to the first embodiment of the present invention.
Figure 6:
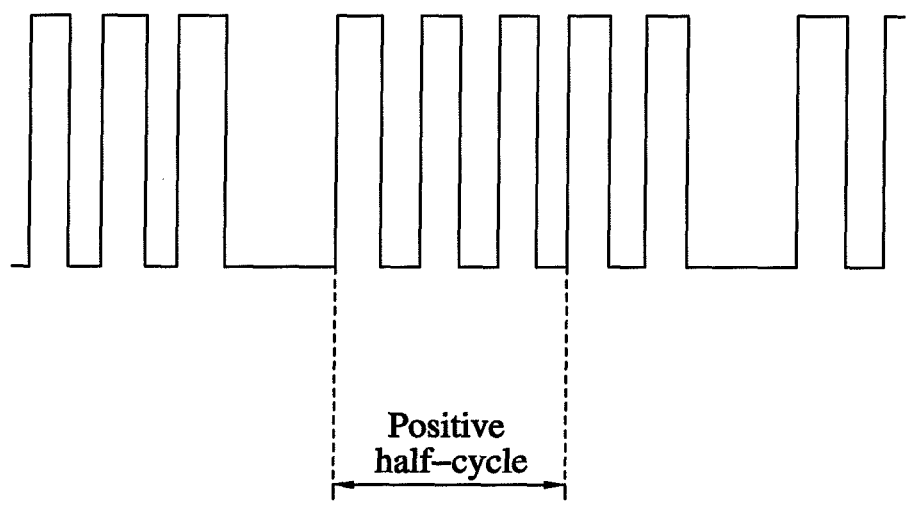
FIG. 6 is a forward half cycle of the sensor waveform diagram obtained according to the first embodiment of the present invention.
Figure 7:
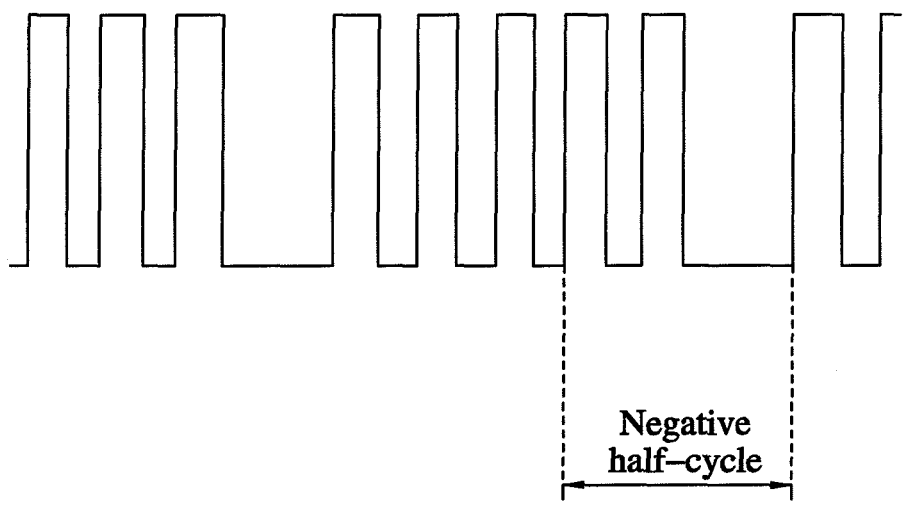
FIG. 7 is a backward half cycle of the sensor waveform diagram obtained according to the first embodiment of the present invention.
Figure 8:
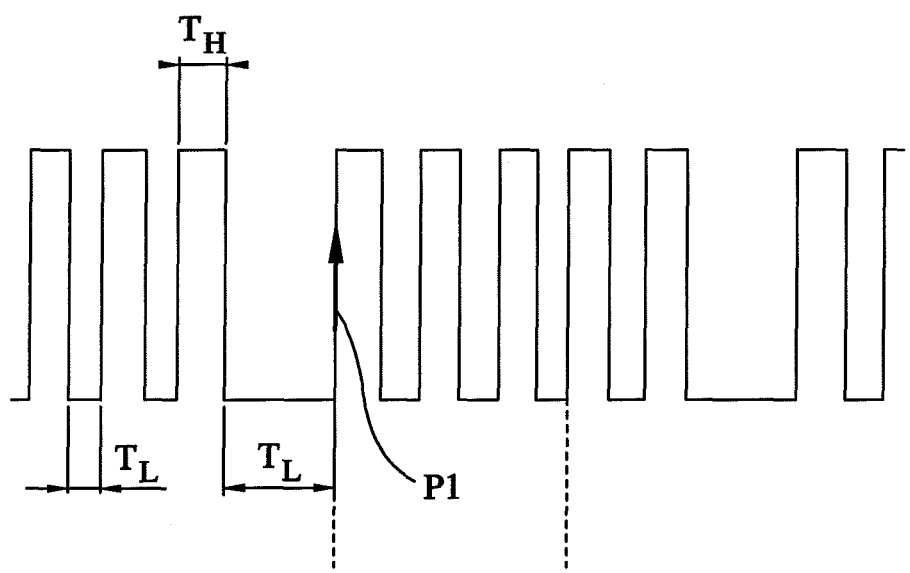
FIG. 8 is a schematic waveform diagram obtained according to the first embodiment of the present invention, illustrating the relationship between high potential time point and low potential time point.
Figure 9:
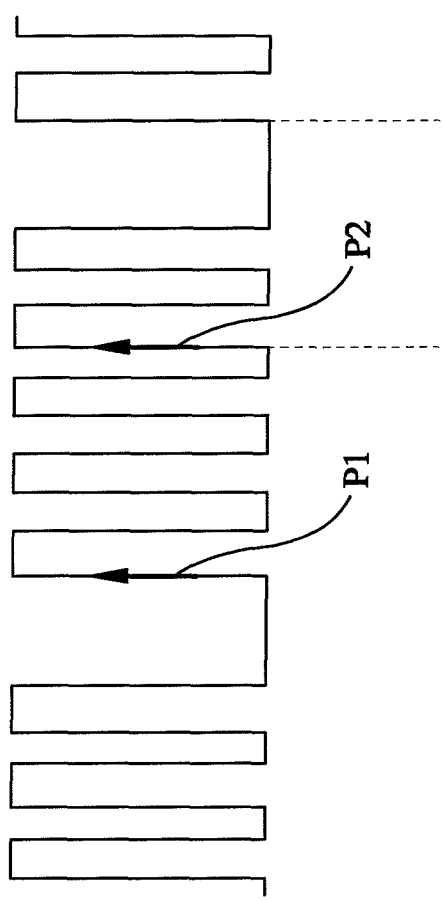
FIG. 9 is a schematic waveform diagram obtained according to the first embodiment of the present invention, illustrating the relationship between the time point corresponding to the first pedaling dead point and the time point corresponding to the second pedaling dead point.

FIGS. 5-7 are waveform diagrams of the rotation of the crank 12 sensed by the sensor (bottom bracket sensor) 52, wherein FIG. 5 is the waveform diagram of one revolution (360° angle) of the crank 12; FIG. 6 is the waveform diagram of one forward half cycle of the crank 12; FIG. 7 is the waveform diagram of one backward half cycle of the crank 12. As illustrated in FIG. 8, the ratio between high-potential duration time $T_H$ and low-potential duration time $T_L$ can be 7:4 and 7:15; when $T_H < T_L$, it means the first pedaling dead point P1 (0° angle position) has been sensed. As illustrated in FIG. 9, when sensed positive-edge triggering three times after sensed the first pedaling dead point, the second pedaling dead point P2 (180° angle position) is confirmed. Thereafter, repeat the aforesaid judgment of $T_H < T_L$ to find the first pedaling dead point, undergoing the cycle again and again. Any waveform sensed by the aforesaid bottom bracket sensor 52 during backward pedaling, the voltage level is constantly low potential, thus, forward pedaling or backward pedaling can easily be determined. In case of backward pedaling, determining the optimal shift timing subject to the aforesaid condition (4), i.e., any time point during backward pedaling can be the optimal shift timing.

Figure 10:
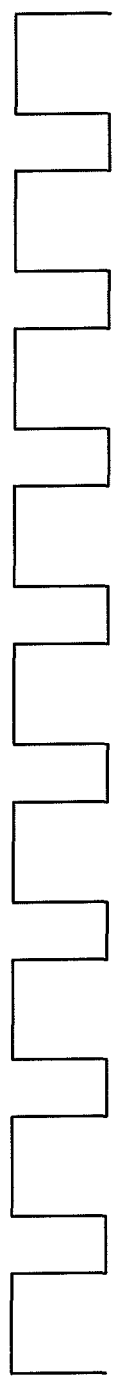
FIG. 10 is a schematic waveform diagram of a Hall component signal obtained during forward pedaling according to the first embodiment of the present invention.
Figure 11:
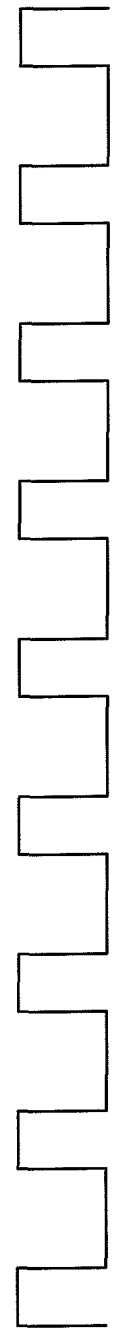
FIG. 11 is a schematic waveform diagram of a Hall component signal obtained during backward pedaling according to the first embodiment of the present invention.

If the sensor 52 is a Hall component, the angular position of the crank 12 as well as forward pedaling/backward pedaling can be directly determined subject to difference of mark-space ratio between forward pedaling waveform and backward pedaling waveform, and the sensed forward pedaling waveform is as shown in FIG. 10 and backward pedaling waveform in FIG. 11.

The operation of the automatic gear-shifting bicycle with optimal shift timing 10 in accordance with the first embodiment of the present invention is outlined hereinafter.

During riding, using the aforesaid condition (1) as an example, the microcomputer 31 controls the pedal position sensor module 51 to detect the time point in which the crank 12 reaches a predetermined angular position, for example, the time point of pedaling dead point. This pedaling dead point in actual pedaling is 0° angle position and 180° angle position for the horizontal plane, i.e., Point 4 and Point 8 in FIG. 4. After obtained the time points of these two pedaling dead points, the current pedaling speed (the rotating speed of the crank 12) can be estimated. Thereafter, subject to the pedaling speed and the time point of the pedaling dead point, the time point in which the crank 12 will reach the pedaling dead point in the next time can be predicted, figuring out the optimal shift timing. Thereafter, if the microcomputer 31 receives a speed-change instruction from the rider or the microcomputer 31 judges speed change shall be made, speed change will not be performed due to the optimal shift timing is not reached yet, and the microcomputer 31 will control the gear shifting control driver 41 to drive the derailleur 16 to change gears when the time point in which the crank 12 reaches the pedaling dead point (i.e., the optimal shift timing) comes. Thus, speed change operation will occur during the time point of pedaling dead point. At this time point, the pedal torque is the least, facilitating gear shifting, avoiding unstable gear mesh and enhancing bicycle riding comfort.

Subject to either of the aforesaid conditions (2), (3) and (4), the optimal shift timing can be found out. After discovered the optimal shift timing, undergo the aforesaid gear shift operation, achieving speed change smoothly.

It is to be noted that the arrangement of the sensor 52 corresponding to the angular position of the crank 12 at the pedaling dead point is simply an example for understanding. The sensor 52 can sense the motion of forward pedaling or backward pedaling without being arranged to face toward the angular position of the crank 12 at the pedaling dead point, and the difference between the angular position of the sensor 52 and the angle of the pedaling dead point can be used with the pedaling speed for figuring out the optimal shift timing, i.e., the arrangement of the sensor 52 is not constrained to face toward the angular position of the crank 12 at the pedaling dead point.

Figure 12:
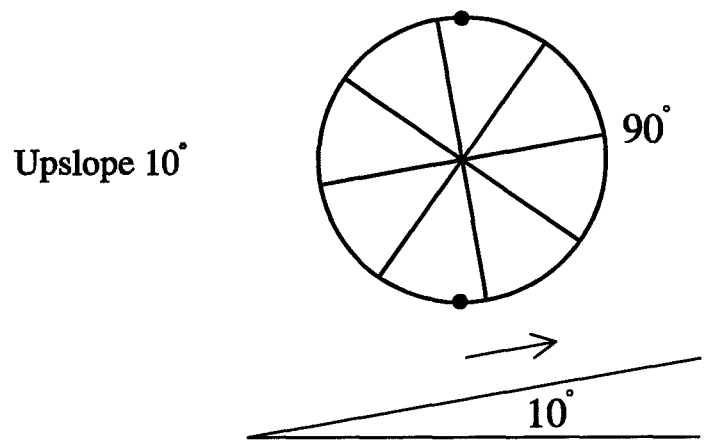
FIG. 12(A) is a schematic drawing illustrating the angular position of the crank and the pedaling dead point obtained at an upward slope according to the first embodiment of the present invention.
FIG. 12(B) is a schematic drawing illustrating the angular position of the crank and the pedaling dead point obtained at a down slope according to the first embodiment of the present invention.
Figure 12:
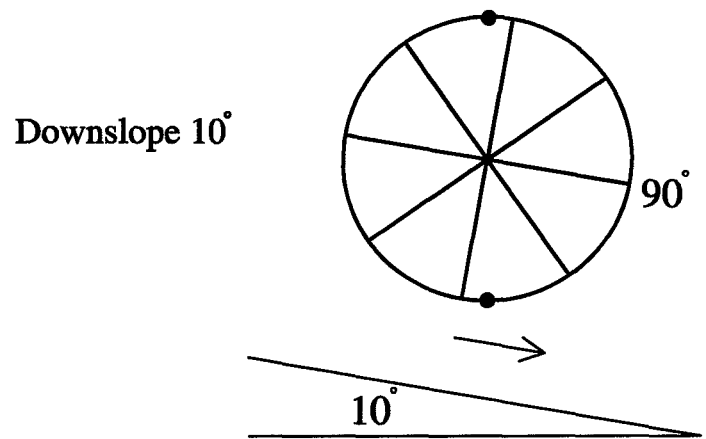

The aforesaid condition is based on the ground without slope. However, when riding up or down a slope, an angular position compensation is necessary to compensate the angular position of the pedaling dead point that is based on 0° angle position or 180° angle position for the horizontal plane. As shown in FIG. 12(A), when riding on a 10° angle upward slope, 10° angle should be added to the angle of the pedaling dead point, i.e., convert 0° angle position and 180° angle position to 10° angle position or 190° angle position. As shown in FIG. 12(B), when riding on a 10° angle down slope, 10° angle should be deducted from the angle of the pedaling dead point, i.e., convert 0° angle position and 180° angle position to 350° (−10°) angle position or 170° angle position.

From this, it can be seen that the first embodiment of the present invention achieves the effects of determining the optimal shift timing and controlling the derailleur 16 to change gears at the optimal shift timing.

Figure 13:
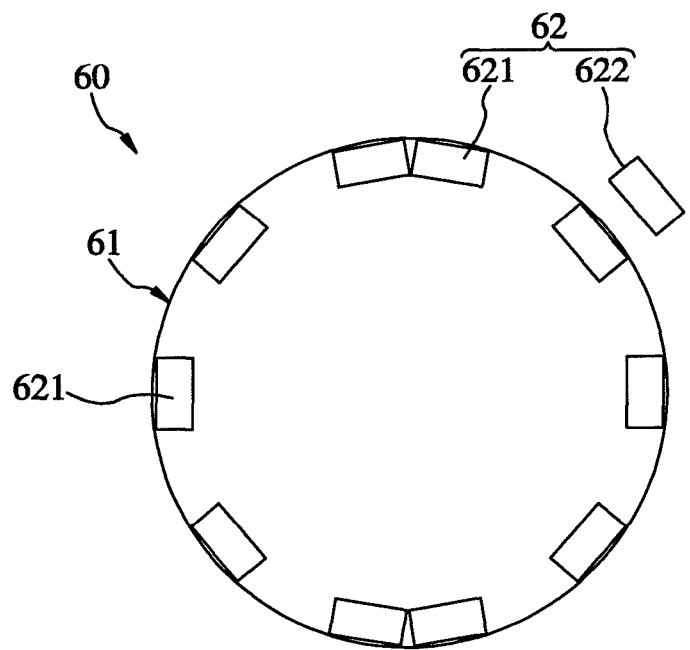
FIG. 13(A) is a schematic structural view of a part of an automatic gear-shifting bicycle with optimal shift timing in accordance with a second embodiment of the present invention, illustrating the arrangement of the magnets of the pedal position sensor module.
FIG. 13(B) is a schematic drawing illustrating the pedal position sensor module and the generated waveform according to the second embodiment of the present invention.
Figure 13:
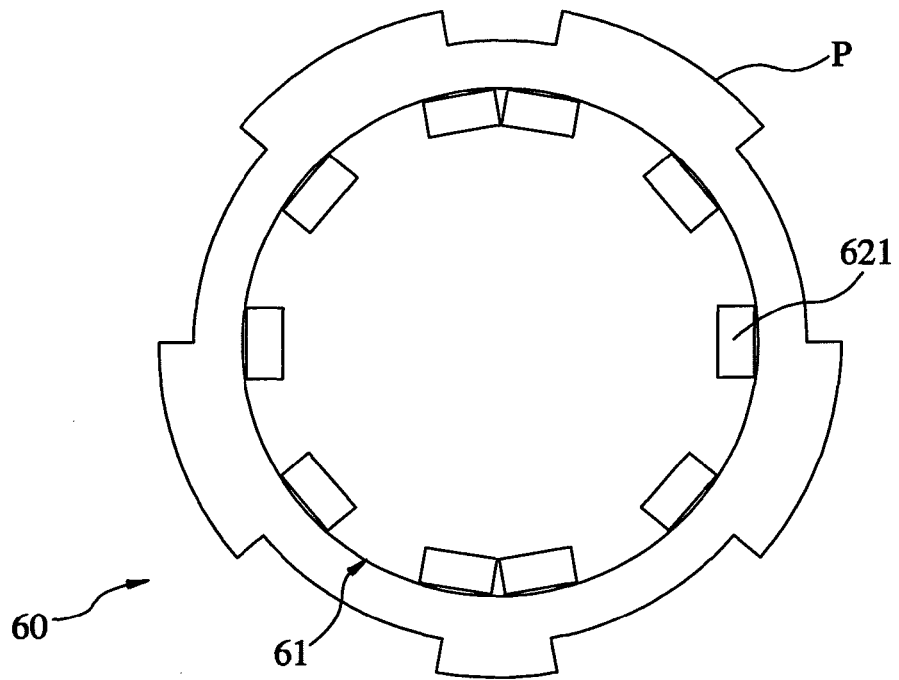

FIGS. 13(A) and 13(B) illustrate an automatic gear-shifting bicycle with optimal shift timing 60 in accordance with a second embodiment of the present invention. This second embodiment is substantially similar to the aforesaid first embodiment with the exceptions outlined hereinafter.

The sensor 62 of the pedal position sensor module 61 comprises a plurality of magnets 621 arranged around the bottom bracket bearing axle 111, and a Hall component 622 mounted in the bottom bracket of the bicycle body (not shown). Two pieces of the magnets 621 are closely arranged together at one side, other two pieces of the magnets 621 are closely arranged together at an opposite side (180° angle), and the other pieces of the magnets 621 are equally spaced around the bottom bracket bearing axle 111 at two sides relative to the two closely arranged pairs of magnets.

The two closely arranged pairs of magnets 621 are respectively disposed corresponding to the bodies of the cranks 12.

Further, the quality of the magnets 621 is an even number, and the magnetic pole of each of the magnets 621 is reversed to that of an adjacent magnet.

Thus, during rotation of the bottom bracket bearing axle 111, the Hall component 622 senses the variation in polarity of the movement of the magnets 621, thereby generating a signal waveform P, as shown in FIG. 13(B). Every big diameter portion of the signal waveform P represents high potential; every small diameter portion of the signal waveform P represents low potential. The interval variation of the sensed waveform is relatively shorter when moving over each pair of closely arranged magnets 621, or relatively longer when moving over equally spaced magnets 621. Thus, by means of the signal waveform P, the angular position of the bottom bracket bearing axle 111 is judged for determining the optimal shift timing and controlling the derailleur 16 (illustrated in FIG. 2) to change gears, achieving the same effects as the aforesaid first embodiment.

The other structural details and effects of this second embodiment are substantially the same as the aforesaid first embodiment and will not be described further.

Figure 14:
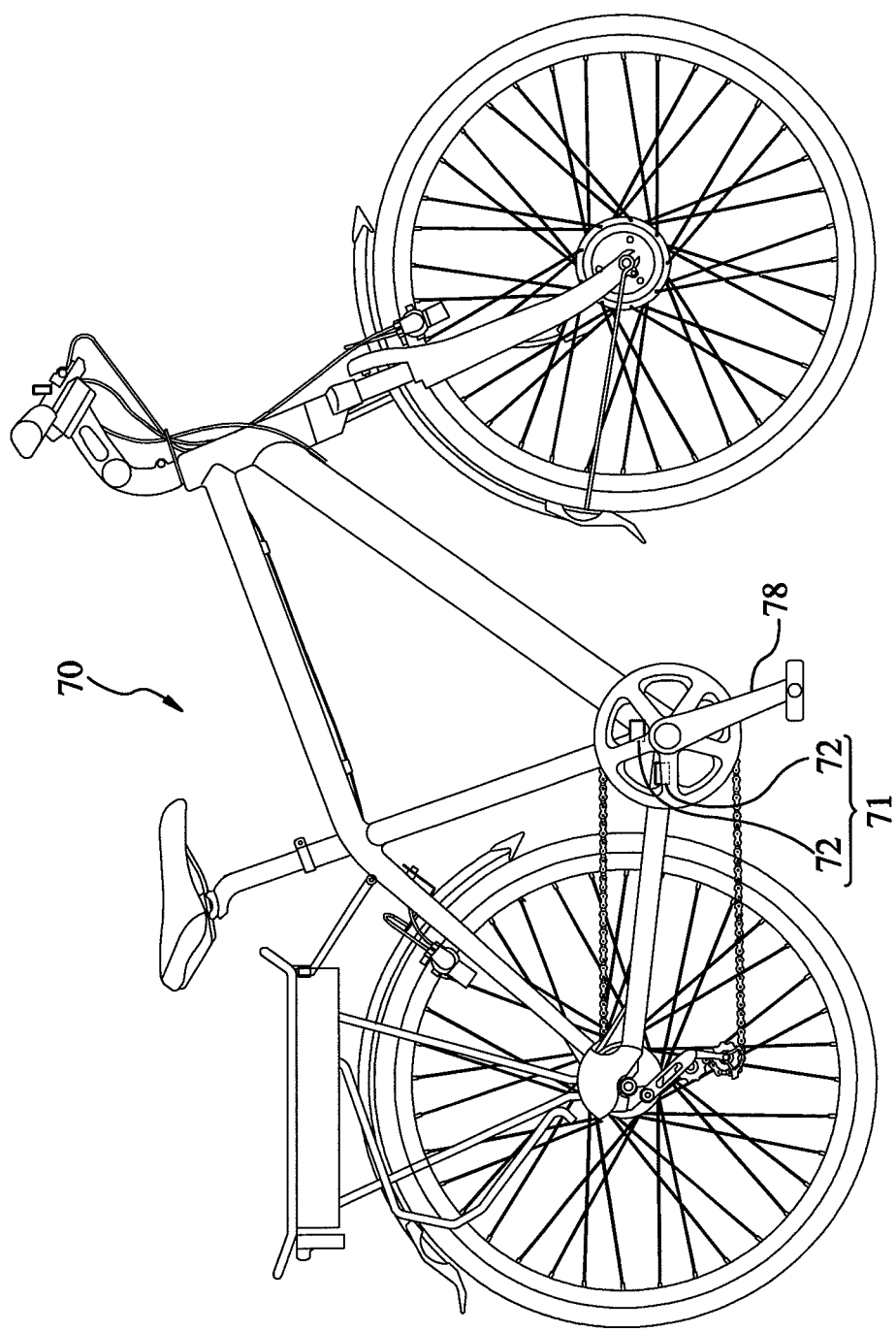
FIG. 14 is a side view of an automatic gear-shifting bicycle with optimal shift timing in accordance with a third embodiment of the present invention.
Figure 15:
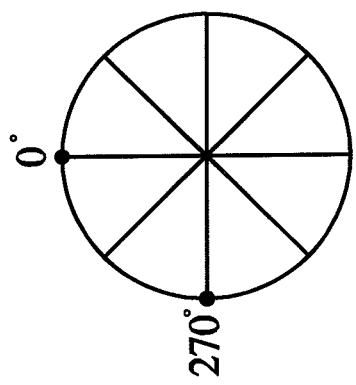
FIG. 15 is a schematic drawing illustrating the angular relationship between the two sensors of the pedal position sensor module according to the second embodiment of the present invention.

FIGS. 14 and 15 illustrate an automatic gear-shifting bicycle with optimal shift timing 70 in accordance with a third embodiment of the present invention. This third embodiment is substantially similar to the aforesaid first embodiment with the exceptions outlined hereinafter.

The pedal position sensor module 71 comprises two sensors 72 respectively arranged at predetermined different angular positions corresponding to the two cranks 78. The contained angle defined between the two sensors 72 is smaller than 180° angle. Further, one sensor 72 is disposed corresponding to the angular position of one crank 78 at the pedaling dead angle, i.e., the 0° angle position.

In this third embodiment, the two sensors 72 can both be Hall components, or photo interrupter sensors. If the two sensors 72 are Hall components, the arrangement of magnets around the bottom bracket bearing axle 111 in the aforesaid first embodiment or the arrangement of a magnet carrier disk (similar to the component referenced by reference numeral 2 in FIG. 8 of cited WO2009036623) on the bottom bracket bearing axle is adopted, allowing determination of forward pedaling or backward pedaling of the cranks 78 subject to the signals generated by the sensors 72. Further, forward pedaling or backward pedaling of the cranks 78 can also be determined subject to angle of one crank 78 and the related time point sensed by the sensors 72. If the two sensors 72 are photo interrupter sensors, forward pedaling or backward pedaling of the cranks 78 is determined subject to angle of one crank 78 and the related time point sensed by the sensors 72. Further, because the contained angle defined between the two sensors 72 is smaller than 180° angle, wherein one sensor 72 is at 0° angle position and the other sensor 72 is at 270° angle position, there are two time durations when determining the time point in which the cranks 78 pass over the sensors 72. Therefore, there is a time difference between these two time durations in one cycle of 360° angle. For example, as shown in FIG. 15, subject to the difference between the time duration from 270° angle position to 0° angle position and the time duration from 0° angle position to 270° angle position, the pedaling is determined to be forward pedaling if the former is relatively shorter, or backward pedaling if the former is relatively longer.

It is to be noted that the arrangement of one of the two sensors 72 corresponding to the angular position of one crank 78 at the pedaling dead point is simply an example for understanding. The two sensors 72 can be arranged in other angular positions beyond the pedaling dead point, achieving estimation of the optimal shift timing, i.e., the arrangement of the sensors 72 is not constrained to the angular position corresponding to the pedaling dead point The other structural details and effects of this third embodiment are substantially the same as the aforesaid first embodiment and will not be described further.

It can thus be seen that the invention can determine the optimal shift timing and control the derailleur to change gears at the optimal shift timing, facilitating gear shifting, avoiding unstable gear mesh and enhancing bicycle riding comfort.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An automatic gear-shifting bicycle with optimal shift timing, comprising: a bicycle body comprising a bottom bracket bearing axle, two cranks respectively coupled to said bottom bracket bearing axle, a pedal supported on each said crank, and a derailleur; a power supply module installed in said bicycle body; a microcomputer electrically coupled to said power supply module; a gear shifting control driver electrically coupled to said microcomputer, and controllable by said microcomputer to drive said derailleur to change gears; and a pedal position sensor module installed in said bicycle body corresponding to at least one said crank and electrically coupled to said microcomputer, enabling said microcomputer to determine the angular position of at least one said crank and the pedaling direction of at least one said crank to be forward pedaling or backward pedaling; wherein, when a person riding the automatic gear-shifting bicycle is pedaling said pedals, said microcomputer determines the optimal shift timing subject to one of the conditions: (1) sensing the angular position of at least one said crank at a predetermined location during forward pedaling and a related time point, and enabling said microcomputer to calculate, subject to the sensed angular position and the related time point, an estimated pedaling speed during forward pedaling and then calculating a calculated time point in which at least one said crank will next pass a pedaling dead point, wherein the pedaling dead point is 0° angle position or 180° angle position from the horizontal plane, and using the calculated time point as the optimal shift timing; or (2) sensing a sensed time point each time at least one said crank reaches the pedaling dead point during forward pedaling, and using the sensed time point as the optimal shift timing; or (3) sensing a backward pedaling of at least one crank, and judging a time point to be the optimal shift timing when a backward pedaling of at least one crank is sensed.

2. The automatic gear-shifting bicycle with optimal shift timing as claimed in claim 1, wherein said predetermined speed value is the difference between the virtual pedaling speed of bicycle speed and gear ratio and an added value.

3. The automatic gear-shifting bicycle with optimal shift timing as claimed in claim 2, wherein said added value is at least 10 revolutions per minute.

4. The automatic gear-shifting bicycle with optimal shift timing as claimed in claim 1, wherein said pedal position sensor module comprises a sensor.

5. The automatic gear-shifting bicycle with optimal shift timing as claimed in claim 4, wherein said sensor of said pedal position sensor module is a bottom bracket sensor.

6. The automatic gear-shifting bicycle with optimal shift timing as claimed in claim 5, wherein said microcomputer determines at least one said crank to be forward pedaling or backward pedaling using a signal induced by said sensor of said pedal position sensor module.

7. The automatic gear-shifting bicycle with optimal shift timing as claimed in claim 6, wherein said sensor of said pedal position sensor module comprises a plurality of magnets arranged around said bottom bracket bearing axle, and a Hall component, said magnets being equally spaced to exhibit a C-shaped arrangement around said bottom bracket bearing axle and to leave a vacancy corresponding to at least one magnet.

8. The automatic gear-shifting bicycle with optimal shift timing as claimed in claim 7, wherein said vacancy faces toward one said crank.

9. The automatic gear-shifting bicycle with optimal shift timing as claimed in claim 6, wherein said sensor of said pedal position sensor module comprises a plurality of magnets arranged around said bottom bracket bearing axle, and a Hall component, at least two of said magnets being closely arranged together and the other said magnets being equally spaced around said bottom bracket bearing axle.

10. The automatic gear-shifting bicycle with optimal shift timing as claimed in claim 9, wherein said at least two of said magnets being closely arranged together are disposed corresponding to the body of one said crank.

11. The automatic gear-shifting bicycle with optimal shift timing as claimed in claim 9, wherein the quantity of said magnets is an even number, and the polarity of each said magnet is reversed to that of an adjacent one said magnet.

12. The automatic gear-shifting bicycle with optimal shift timing as claimed in claim 1, wherein said pedal position sensor module comprises two sensors.

13. The automatic gear-shifting bicycle with optimal shift timing as claimed in claim 12, wherein said two sensors of said pedal position sensor module are arranged at different angular positions corresponding to a predetermined angle relative to said cranks.

14. The automatic gear-shifting bicycle with optimal shift timing as claimed in claim 13, wherein said two sensors define a contained angle smaller than 180° angle.

15. The automatic gear-shifting bicycle with optimal shift timing as claimed in claim 14, wherein one said sensor is disposed at an angular position corresponding to the angular position of one said crank at the pedaling dead angle.

16. The automatic gear-shifting bicycle with optimal shift timing as claimed in claim 12, wherein said two sensors of said pedal position sensor module comprises are Hall component used with a magnet carrier disk at said bottom bracket bearing axle or a plurality of magnets around said bottom bracket bearing axle.

17. The automatic gear-shifting bicycle with optimal shift timing as claimed in claim 16, wherein said two sensors of said pedal position sensor module are Hall components; said microcomputer determines the motion of at least one said crank to be forward pedaling or backward pedaling subject to signals generated by said Hall components.

18. The automatic gear-shifting bicycle with optimal shift timing as claimed in claim 12, wherein said microcomputer determines the motion of at least one said crank to be forward pedaling or backward pedaling subject to the angular position of at least one said crank at the pedaling dead point and the related time point sensed by said two sensors.

19. The automatic gear-shifting bicycle with optimal shift timing as claimed in claim 1, wherein in the condition (1), the angular position of at least one said crank at the predetermined location during forward pedaling is not the angular position at the pedaling dead point.

* * * * *